United States Patent
Foster et al.

(10) Patent No.: US 9,439,087 B2
(45) Date of Patent: Sep. 6, 2016

(54) ANALYZING RADIO NETWORK COVERAGE

(75) Inventors: Gerard Terence Foster, Marston Meysey (GB); Ian Goetz, Thame (GB)

(73) Assignee: TEOCO Corporation, Fairfax, VA (US)

( * ) Notice: Subject to any disclaimer, the term of this patent is extended or adjusted under 35 U.S.C. 154(b) by 372 days.

(21) Appl. No.: 13/131,522

(22) PCT Filed: Nov. 17, 2009

(86) PCT No.: PCT/GB2009/051558
§ 371 (c)(1),
(2), (4) Date: Oct. 13, 2011

(87) PCT Pub. No.: WO2010/064027
PCT Pub. Date: Jun. 10, 2010

(65) Prior Publication Data
US 2012/0039191 A1    Feb. 16, 2012

(30) Foreign Application Priority Data
Dec. 1, 2008   (GB) .................................. 0821923.0

(51) Int. Cl.
*H04L 1/00*     (2006.01)
*H04W 24/08*    (2009.01)

(52) U.S. Cl.
CPC .................................. *H04W 24/08* (2013.01)

(58) Field of Classification Search
CPC .... H04W 76/02; H04W 64/00; H04W 24/08
USPC ....................................................... 370/252
See application file for complete search history.

(56) References Cited

U.S. PATENT DOCUMENTS

| 6,226,281 B1 * | 5/2001 | Cordier ............... H04W 52/343 370/335 |
| 7,245,914 B2 * | 7/2007 | Ishikawa ............... H04W 24/00 455/436 |

(Continued)

FOREIGN PATENT DOCUMENTS

| DE | 19533472 A1 | 3/1997 |
| WO | 00/28755 A1 | 5/2000 |
| WO | 2007038948 A1 | 4/2007 |

*Primary Examiner* — Faisal Choudhury
(74) *Attorney, Agent, or Firm* — ATFirm PLLC; Ralph P. Albrecht

(57) ABSTRACT

A radio network coverage area provided by a mobile radio network is analyzed. The analysis is provided by receiving control messages from a first interface communicated between a base station of the mobile radio network and a radio network controller, the control messages being provided for controlling the communications of the data to or from the mobile terminals via the base station. The method includes identifying a mobile identity number associated with the mobile terminal from the control messages communicated via the first interface, identifying, using the mobile identity number, mobility control messages communicated via the first interface, the mobility control messages providing an indication of a relative distance of the mobile terminal from the base station, receiving data communicated via a second interface between the radio network controller and a core network part of the mobile radio network, identifying the data communicated from the mobile terminal, using the mobile identity number identified from the first interface, determining a relative measure of quality of the data received from the mobile terminal, and generating a performance map providing a relative distance of the mobile terminal from the base station and a quality of data communicated at the relative distance from the mobile terminal.

18 Claims, 9 Drawing Sheets

(56) References Cited

U.S. PATENT DOCUMENTS

| | | |
|---|---|---|
| 2002/0127993 A1 | 9/2002 | Zappala |
| 2005/0136950 A1* | 6/2005 | Masuda ................ H04W 88/14 455/462 |
| 2007/0004394 A1* | 1/2007 | Chu ...................... H04W 24/08 455/422.1 |
| 2008/0004015 A1 | 1/2008 | Jones et al. |
| 2008/0159223 A1* | 7/2008 | Palat ................. H04W 36/0022 370/331 |
| 2008/0240438 A1* | 10/2008 | Huang .................. H04W 12/04 380/270 |
| 2011/0134863 A1* | 6/2011 | Zisimopoulous et al. .... 370/329 |

* cited by examiner

ANALYZING RADIO NETWORK COVERAGE

FIELD OF INVENTION

The present invention relates to data processing apparatus for and methods of analysing a radio network coverage area provided by one or more base stations of a mobile radio network. The present invention also relates telecommunication systems and methods of communicating.

BACKGROUND OF THE INVENTION

Drive testing is a technique in which a vehicle which is equipped with a receiver is driven around a coverage area of a mobile radio network in order to generate a map of a relative performance of data communications within a radio coverage area provided by one or more base stations of the mobile radio network. The receiver is arranged to receive data in accordance with a wireless access interface specified for the mobile radio network concerned in order to determine a quality of the communicated data. The vehicle is driven by an operator throughout the coverage area of the mobile radio network in order to establish a map identifying a performance of the wireless access interface in respect of a quality of service at locations within an area covered by the mobile radio network. As will be appreciated, employing a technique in which an operator must drive a vehicle around a mobile radio network in order to establish a performance of that network is both time consuming and therefore expensive.

Although drive testing provides an accurate measurement of performance of a mobile radio network it is desirable to find alternative techniques which both reduce cost and complexity.

A further technique of monitoring the behaviour of a mobile radio network is to use a so called "probe" system. In such systems a particular network element or link between network elements of the mobile radio network is monitored by some form of data processor. Typically, the data processor records all data transmitted across the network element/link which is then processed. Due to the complexity of most modern mobile radio networks, the volume of data collected is usually very high, even if some form of filtering is applied to isolate a particular type of data which is then recorded. For example, if a probe system were to be used to capture data relating to a particular coverage area even if a filter was applied such that only data pertaining to that coverage area was captured, the quantity of data that would be collected would be likely to be very great. It is very difficult to manage, in a structured way, such large quantities of data. It is particularly difficult to do so in a timely manner.

SUMMARY OF INVENTION

According to the present invention there is provided a method of analysing a radio network coverage area provided by a mobile radio network, the mobile radio network including one or more radio access network parts and one or more core network parts. The radio network parts may include one or more base stations which are operable to provide a wireless communications interface for communicating data to and from mobile terminals within a radio coverage area provided by each of the base stations, and may include one or more one radio network controllers connected to the base stations via a first interface. The radio network controller may be arranged to control the communication of data to and from the mobile terminals via the base stations. The core network part is connected to the radio network part via a second interface for communicating the data to and from the radio network part to support the communications of the data to and from the mobile terminals. The method comprises receiving control messages from the first interface, identifying a mobile identity number associated with one or more of the mobile terminals from the control messages communicated via the first interface, identifying, using the mobile identity number, mobility control messages communicated via the first interface, the mobility control messages providing an indication of a relative distance of the mobile terminal from the base station, receiving the data communicated via the second interface between the radio network controller and the core network, identifying the data communicated from the mobile terminal, using the mobile identity number identified from the first interface, determining a relative measure of quality of the data received from the mobile terminal, and generating a performance map providing a relative distance of the mobile terminal from the base station and a quality of data communicated at the relative distance from the mobile terminal.

In some embodiments the control messages may be for example communicated from the first interface between a base station of the mobile radio network and a radio network controller.

The present technique provides a structured way to extract a statistical estimate of cellular performance over a coverage area by using the actual cellular system control plane to guide the probe system to be able to save enough data to estimate performance with respect to coverage maps and yet not collect all the data from that coverage area. Thus, embodiments of the present invention can provide a technique for generating a map of a relative performance of a coverage area of one or more base stations of a mobile radio network or wireless access network without a need for an operator to physically sample the quality of data communications at that location within the coverage area provided by the base station. Effectively the map of performance coverage with respect to distance from the base stations is generated by using signalling probes to retrieve copies of messages that are sent via interfaces between a radio network controller and the core network, and the radio network controller and the base station, which provides an indication of a relative distance of the mobile terminal from the base station. In one example, the relative distance is indicated by a timing advance, which is typically used in TDMA wireless access systems to account for a propagation delay between transmission of a burst of data from a mobile station to the base station. In other examples the relative range from the base station can be determined from power control messages.

By identifying mobile terminals which are active, and identifying from mobility control messages communicated from the radio network controller to the base stations for a particular mobile terminal, it is possible to identify a mobile identity number, as well as a base station to which the mobile terminal is attach. Furthermore, the mobility control messages provide an indication of the relative range of the mobile terminal from the base station within a coverage area provided by the base station. Having identified a mobile terminal and a relative range of the mobile terminal from the base station, the mobile identity number can also be used to determine a relative quality of communications experienced by that mobile terminal. This is achieved by using a probe between the radio network controller and the core network such as the mobile switching centre or service support node to extract data communicated by that mobile terminal. Using known techniques such as, for example, identifying a type of the mobile terminal and therefore a relative quality of the data generated for example via a voice codec or using known data which would be communicated by the mobile terminal, a relative measure of the quality of communications can be identified. Thus, by using the relative range of the mobile terminal from the base station and a measurement of the quality of communication at the range, a relative performance map can be generated for a base station within a mobile radio network.

It would be appreciated that the term base station will refer to and has been used to identify any radio components which communicate data to and from a mobile terminal wirelessly. Therefore for the example of a WiFi communications network, the base station would be a wireless access node. Similarly the radio network controller could be any node which generates control messages for controlling the communication of data to the mobile terminal.

The technique is also generally applicable to any communications system where a probe system may be employed across one or more mobile communications interfaces. This allows a control stream to be decoded which yields addressing information that identifies data information on that, or any other, related communications interface. Accordingly, a performance in the transmission of data between a number of clients connected to the communications system, identified by one of their temporary and/or permanent addresses in that system, can be used to produce a quantifiable performance map of performance information versus coverage or client distribution. In this general application of the technique, positional information may also be determined by using the identified client address to correlate other probed signalling flows which relate or directly contain such positional and/or mobility information. Various aspects and features of the present invention are defined in the appended claims. Other aspects of the present invention include a telecommunication system, a data processor operable to analyse a network coverage area provided by one or more base stations of a mobile radio network.

BRIEF DESCRIPTION OF THE DRAWINGS

Embodiments of the present invention will now be described with reference to the accompanying drawings in which like parts have the same numerical references and in which.

DESCRIPTION OF EXAMPLE EMBODIMENTS

Figure 1:
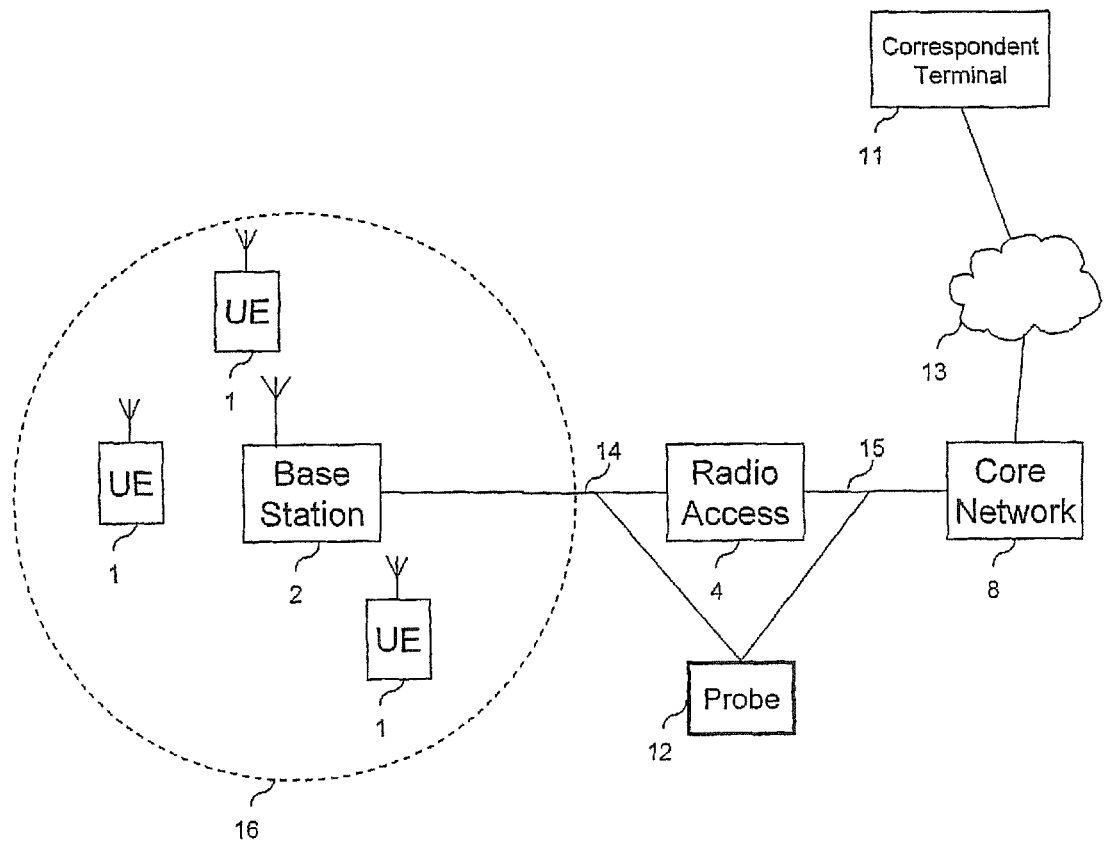
FIG. 1 is a schematic representation of a generic mobile radio network including a data analysing probe.

FIG. 1 provides a schematic block diagram of a generic mobile radio network. The mobile radio network includes a plurality of mobile terminals 1, a base station 2, a radio access controller 4 and a core network 8. A data analysing probe 12 is provided which is arranged to target and intercept data transmitted between components of the mobile radio network. FIG. 1 also shows a terminating terminal 11 connected to the core network 8 via an external network 13. The mobile radio network shown in FIG. 1 is a generic mobile radio network because the technique of the present invention can be applied to a number of different types of mobile radio networks. The mobile radio network could be operated in accordance with the global system for mobiles (GSM) in which case the base station 4 is more commonly referred to as a base transceiver station (BTS) and the radio access controller is referred to as a base station controller (BSC). Alternatively, the mobile radio network could be operated in accordance with the universal mobile telecommunication standard (UMTS) in which case the base station is commonly be referred to as a "Node B" and the radio access controller is referred to as a "radio network controller" (RNC). Alternatively, the base station may be a wireless access node forming part of a WiFi or WiMAX network. In the case of a WiFi or WiMAX network, the functionality of the base station and the functionality of the radio access controller (explained further below) may be combined within the wireless access node itself or may be part of a higher order concentrator, security gateway or other radio access network edge device.

In the mobile radio network shown in FIG. 1, data is communicated to and from the mobile terminals 1 via a wireless access interface provided by the base station 2. The wireless access interface provided by the base station 2 extends across a coverage area 16.

The wireless access interface is provided by a radio link between each mobile terminal 1 and the base station 2. The quality of the radio link between the mobile terminals 1 and the base station 2 is unlikely to be uniform across the coverage area 16. For example, the further a mobile device 1 from the base station 2, the worse the radio link is likely to become. Furthermore, specific regions of the coverage area may suffer from localised degradation in the quality of the radio link. This may be caused by a number of factors such as multipath interference (interference caused between different propagation paths of the same signal), interference from other sources (for example base stations or mobile terminals forming part of other mobile radio networks), radio "shadows" caused by geographical features such as hills or large buildings and so on. Some of the factors degrading the quality of the radio link are likely to vary very little or not at all over time (for example signal degradation caused by a geographical feature). However other factors such as interference from other sources may vary over time. Furthermore, changes made to the base station 2 such as base station relocation or changes in transmission power range may also cause the quality of the radio interface to vary.

As will be appreciated, as there is a decrease in the quality of the radio link between a mobile terminal 1 and the base station 4, more errors are likely occur in the data exchanged across the wireless access interface. A result of this, for example, is that a quality of a voice call experienced by a user of a mobile terminal is likely to be degraded. Another result might be that a time taken to transmit and receive data relating to a data call (for example web browsing) will be increased.

As shown in FIG. 1, the base station 2 is connected to a radio access controller 4 which controls the base station 2 and communicates data between the core network 8 and the mobile terminal 1. Data communicated between the base station 2 and the radio access controller 4 is transmitted across a first interface 14. Data communicated between the radio access controller 4 and the core network 8 is transmitted across a second interface 15. For a typical mobile radio network, the data transmitted across the first and second interfaces can be broadly divided into two categories: user data and signalling data. User data is typically data transmitted to and from the mobile terminal 1 and comprises data generated or used by the mobile terminal. In one example, if the mobile terminal 1 was engaged in a voice call with the terminating terminal 11, then the user data would include data corresponding to the voice data exchanged between the mobile terminal 1 and the terminating terminal 11. On the other hand, signalling data is data which concerns the control of the mobile radio network. This will include control data sent from the core network 8 to the radio access controller 4 to control aspects of the radio access controller's behaviour and control data sent from the radio access controller 4 to the base station 2 to control aspects of the base station's behaviour. The signalling data, particularly that transmitted across the first interface 14 (between the base station 2 and the radio access controller 4), typically includes mobility control data which is data concerned with the management of the mobile terminal's mobility within the mobile radio network. This will include signalling data providing location tracking. Location tracking generally refers to identifying which mobile terminals 1 are currently in the coverage area 16 provided by the base station 2. This is necessary for example so that the core network can route incoming calls to a particular mobile terminal. The signalling data may also include power control data and/or timing control data. Power control is a technique for managing the power with which the mobile terminals 1 and the base stations transmit radio signals to each other across the wireless interface. As will be understood, a mobile terminal very close to the base station 2 can transmit data to the base station 2 at a reduced power. Equally, the base station can transmit data to the mobile terminal at a reduced power. Correspondingly, a mobile terminal on the very edge of the coverage area 16 will most likely need to transmit data at an increased power, as will the base station 2. Accordingly, signalling data such as power control data provides an indication of the distance of a mobile terminal from the base station. Timing control, particularly for time division multiple access (TDMA) systems, is where the base station 2 generates commands to send to the mobile terminals 1 to adjust the timing of the transmission of bursts of data with respect to a frame structure in order to account for a propagation delay that results when radio signals are communicated from the mobile terminals to, the base station 2. Accordingly, timing control data also provides an indication of the distance of a mobile terminal from the base station.

As will be understood, changes within the mobile radio network, for example the quality of the radio interface between the mobile terminal 1 and the base station 2 or the physical location of the mobile terminal with respect to the base station, will be reflected in the signalling data transmitted across the first and second interfaces.

User data transmitted across the first and second interfaces 14, 15 will include information from which an estimation of the quality of the radio interface can be produced. In one example, this can be done by comparing parts of the user data corresponding to data transmitted by the mobile device which were transmitted as a known value, with the actual received value. The degree to which the known value and the received value differ provides an indication of the quality of the radio interface.

The mobile radio network shown in FIG. 1 includes a probe 12 which has access to information exchanged between various network entities across various interfaces of the mobile radio network. In the diagram shown in FIG. 1, the probe 12 is connected to the network at a point on the first interface 14 and a point on the second interface 15. It will be understood that this is merely illustrative and the probe 12 can be connected to any suitable point within the network. In practice for example, the probe 12 may in fact download data straight from the radio access controller 4.

Furthermore, specific positional information may be determined through the use of a probe if a "Location Reporting" function has been enabled by the network system and if the signalling data is able to be probed by using a particular determined client's address as a control data key (for example mobile, Calling/Called Host or general user device).

The probe 12 is arranged to intercept signalling data from which the identity of mobile terminals, which are engaged in active communications sessions, can be determined. An example of such an active communication session may be a voice call between one of the mobile terminals 1 and the terminating terminal 11. As described above, the signalling data also provides an indication of the distance of each active mobile terminal from the base station. Once the identity of the active mobile terminals has been determined, these identities can then be used to target and intercept user plane data corresponding to those particular active mobile terminals. From the intercepted user plane data, a quality of the radio interface can be determined for each active mobile. Because data has been extracted from the signalling plane indicating the distance of each mobile from the base station, a coverage map can then be generated which indicates the quality of the radio link at different points within the coverage area 16.

Figure 2:
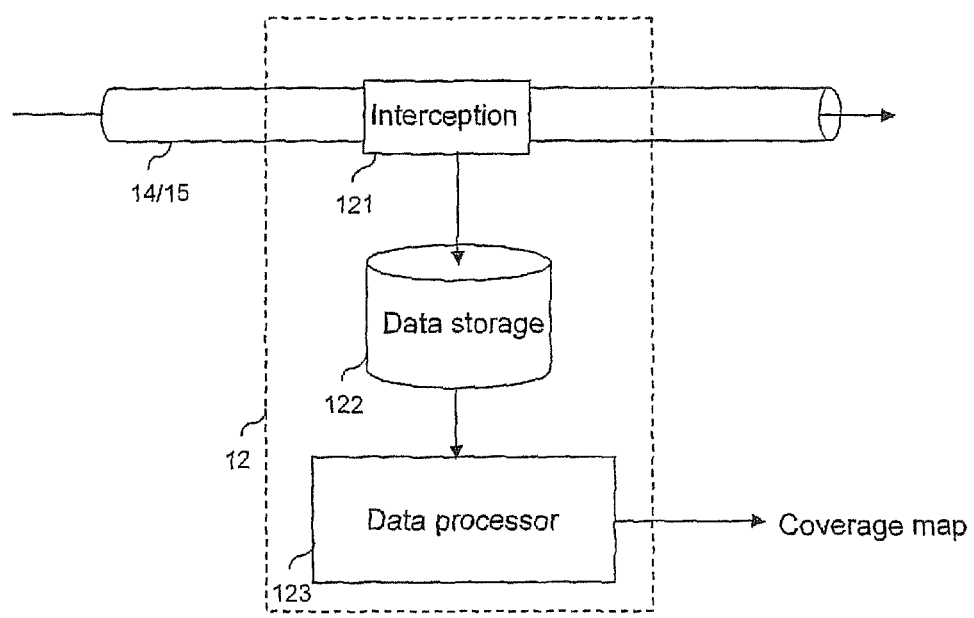
FIG. 2 provides a schematic block diagram showing functionality provided by the data analysing probe 12, shown in FIG. 1.

FIG. 2 provides a systematic diagram showing the functionality provided by the data analysing probe 12. FIG. 2 illustrates the functions performed by the probe as opposed to indicating any physical arrangement. The probe 12 is arranged to intercept data transmitted across the interfaces 14/15 of the network. The point at which the interface is probed may vary and may, as shown in FIG. 1 be at one or more points. However, for simplicity a point of interception 121 is shown at a single point on a non-specific interface 14/15. At the point of interception 12, the relevant data (e.g. active mobile terminal identities identified in the control plane and corresponding data relating to quality of radio interface) is extracted from the interface 14/15. This data is then stored in a data storage unit 122 and subsequently processed by a map generation unit 123. The map generation unit 123 correlates the data as described above and a coverage map can be generated and present in any suitable form. This may be to a graphical display or in a suitable file format.

Figure 3:
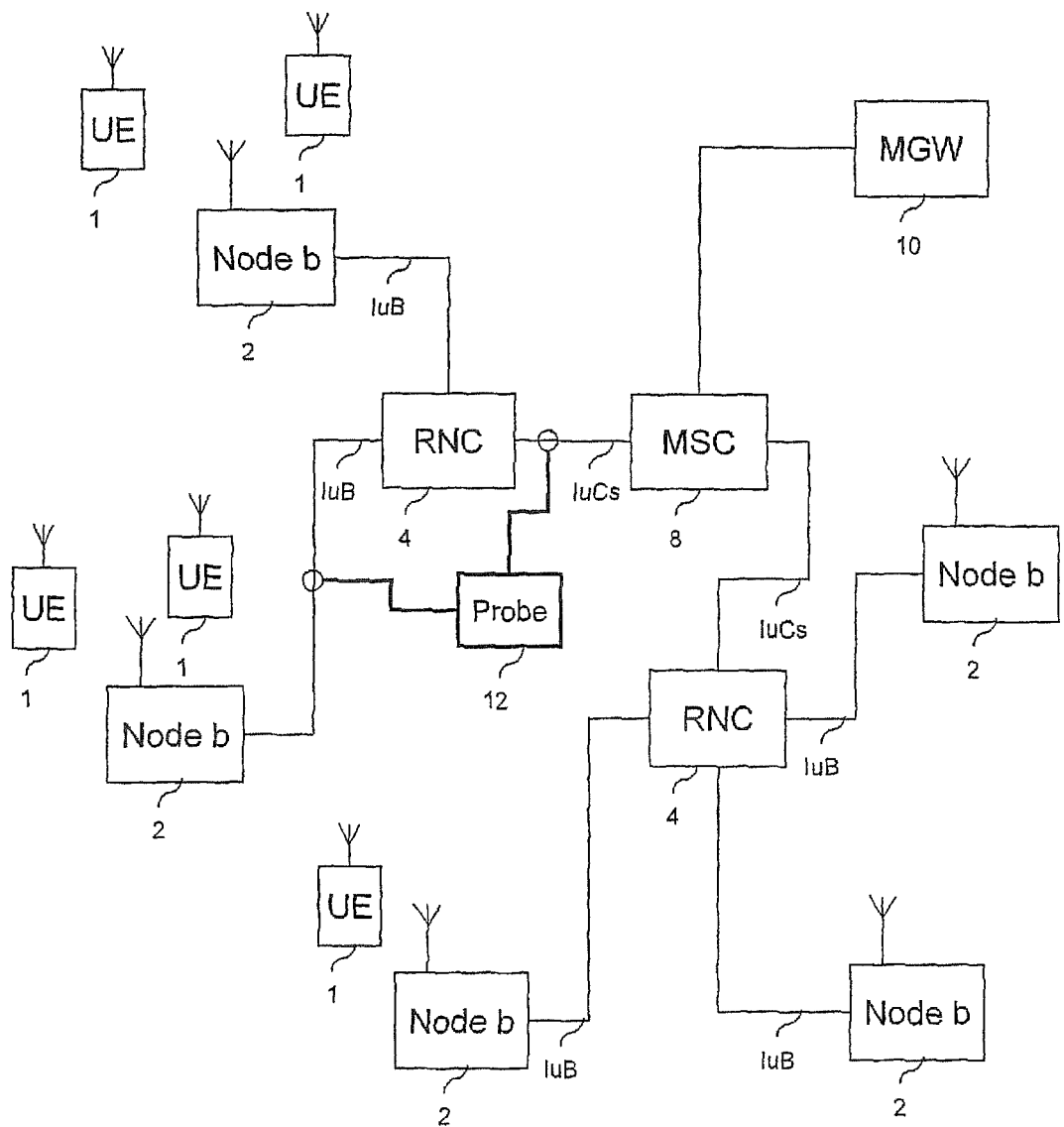
FIG. 3 provides a schematic block diagram of a mobile radio network illustrating an embodiment of the present technique implemented within a 3GPP UMTS mobile radio network.

FIG. 3 shows an embodiment of the present technique implemented within a 3GPP UMTS network. Accordingly, the base station, radio access controller and core network functionality are provided by Node B, RNCs and an MSC/MGW (as will be understood, this could be a SGSN/GGSN in a Packet Switched core network) respectively. In this particular embodiment, the probe is provided by a data processor 12 which is arranged to intercept signalling data to determine the identity and distance from the Node B of mobile terminals engaging in voice calls and then intercept user plane data corresponding to the identified mobile terminals to determine a quality of the radio interface provided in various regions of the coverage area provided by the Node B.

The interfaces connecting each Node B 1 to its respective RNC 4 is provided by an Iub interface. The interface connecting each RNC 4 to the MSC 8 is provided by an IuCS interface.

Figure 4:
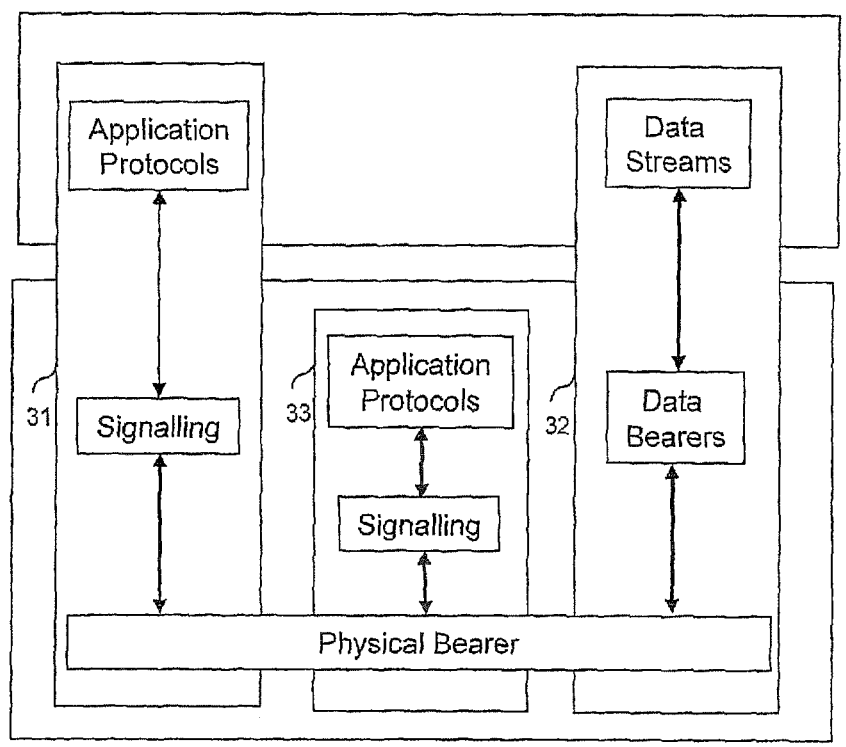
FIG. 4 shows a representation of a simplified protocol stack of an IuCS and Iub interface.

The Iub and IuCS interfaces are 3GPP defined interfaces (the Iub interface is defined further in 3GPP TS25.430 and the IuCS interface is defined further in 3GPP TS25.412). A simplified protocol stack of the IuCS and Iub interface is illustrated in FIG. 4. As shown in FIG. 4, information transmitted across the Iub and Iucs interfaces can be divided into three "planes"; a User Plane (UP) 31, a Control Plane (CP) 32 and a management/Operations Administration and Management (OAM) plane 33. The UP 31 controls data streams to and from the mobile terminal (for example voice data), the CP controls signalling messages communicated between the RNC, Node B 1 and MSC 8 and the OAM plane 33 controls underlying transport mechanisms which support the UP and the CP.

The signalling plane of the Iub interface includes a "Node B application part" (NBAP) protocol. This protocol provides a mechanism by which the Node B is controlled by the RNC. The NBAP is subdivided into "Common NBAP" (C-NBAP) and "Dedicated NBAP" (D-NBAP). The Common NBAP is the means whereby the RNC controls overall Node B functionality. The Dedicated NBAP controls radio links which are provided to individual user equipment. In UMTS networks, much of the mobility functionality is handled directly by the RNC and the Node B. NBAP messages exchanged between the Node B and the RNC therefore contain a great deal of useful information regarding the status and activity of mobile terminals operating within a cell provided by a Node B.

The user plane of the IuCS interface contains voice data being transmitted from the RNC onto the MSC/MGW for onward connection to the terminating mobile terminal 11. Much of the information relating to the radio access interface and mobile terminal mobility is not carried across the IuCS interface and it is therefore a convenient interface from which to intercept user plane data.

There are advantages in probing at the radio network control level of a mobile system in that southbound interfaces are RAN (Radio Access Network) control rich and the northbound interfaces are CN (Core Network) control rich and both southbound and northbound addressing at this level are usually easily related. Thus, northbound and southbound CP and UP coordination at this level is realisable with passive probing. Whereas, above and below this level in the network the interfaces are more difficult to relate directly without intrusive network element probing. This means that the RNC, BSC, RAS and other similar network element devices in a mobile network make ideal places to probe RAN and CN in a coordinated manner. In this Release R1999, 3GPP, Circuit Switched, UMTS specific example of the present technique, user data is transmitted across the IuCS interface using an asynchronous transfer mode (ATM) interface. More specifically an ATM adaptation layer 2 (AAL2) is used. User data is multiplexed across the AAL2 layer by virtue of an access link control application protocol (ALCAP). ATM frames relating to individual voice calls are multiplexed at the AAL2 layer by using channel IDs.

Figure 5:
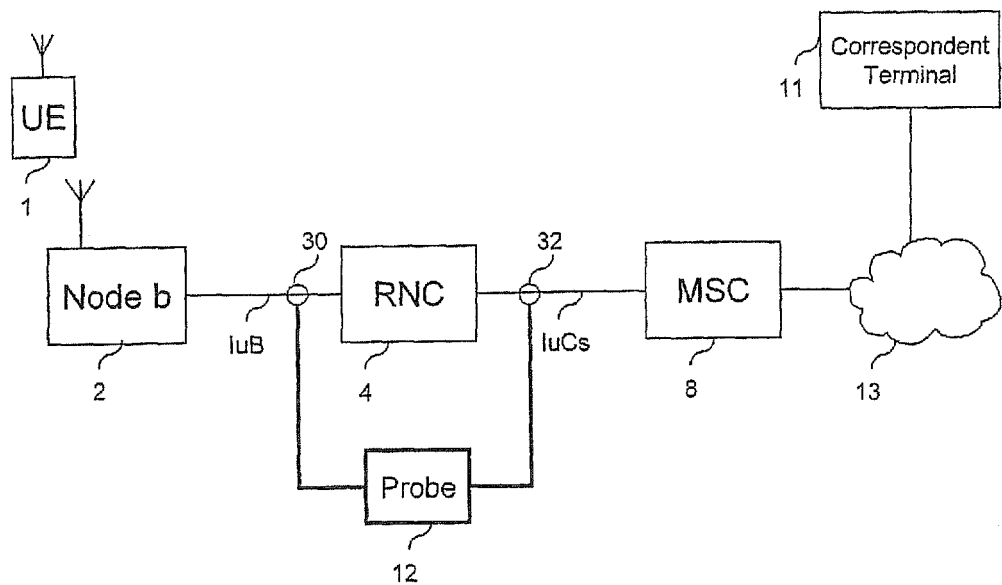
FIG. 5 shows a schematic diagram of a communication chain which is a simplified version of the circuit switched elements of a UMTS mobile radio network shown in FIG. 3.

FIG. 5 shows a communication chain which is a simplified version of the UMTS mobile radio network shown in FIG. 3. FIG. 5 provides an end-to-end illustration of a mobile originated voice call, the signalling for which is intercepted by the dale processor 12. The mobile terminal 1 originates a voice call to the terminating terminal 11 which is connected via an external network 13. Once the voice call has been established, data is transmitted from the mobile terminal 1 to the terminating terminal 11, via the Node B 2, the RNC 4, the MSC 8 and the external network 13.

As soon as the mobile terminal 1 becomes active within the cell provided by the Node B 2 (for example by being switched on or moving in from another cell), it is allocated a temporary mobile subscriber identity number (TMSI) by the network. The TMSI is used by the network to identify and page the mobile terminal 1. Additionally the RNC 4 may allocate the mobile terminal 1 a Radio Network Temporary Identity (RNTI) which is used by the radio access network part to identify the mobile terminal 1.

Figure 6:
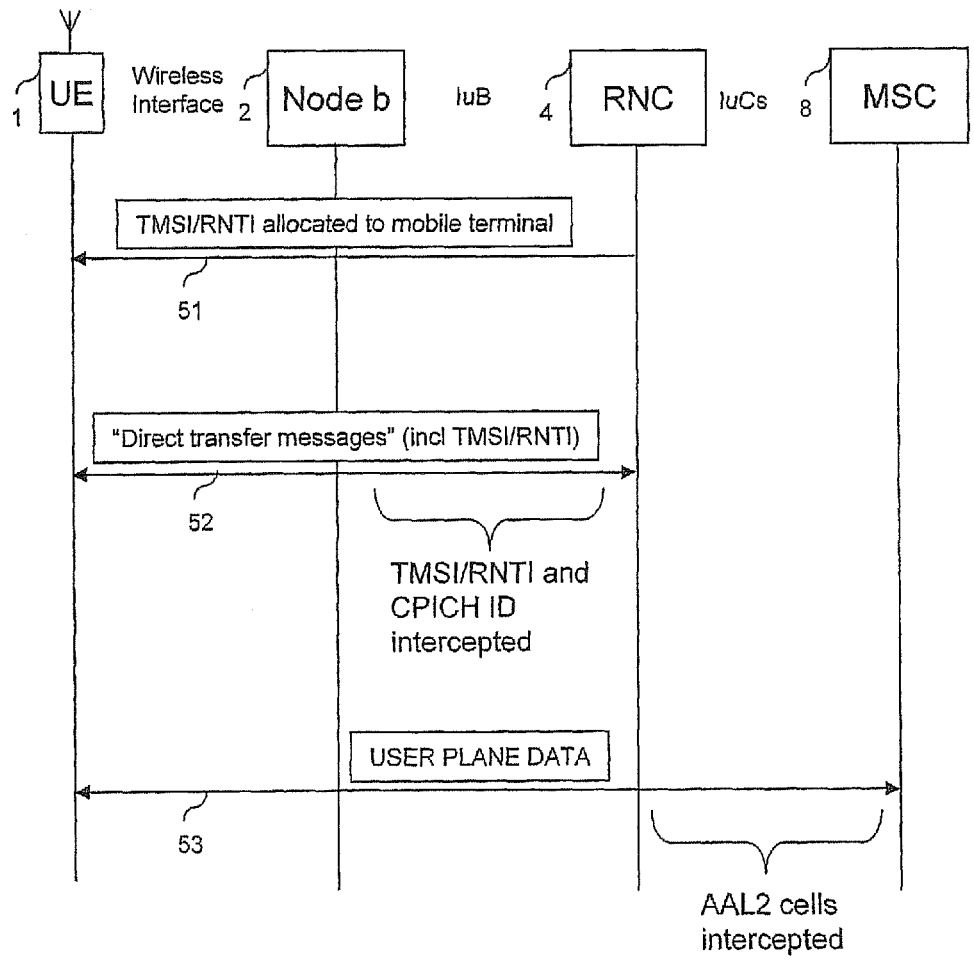
FIG. 6 shows a simplified illustration of a flow of messages between a mobile terminal, a Node B, a radio network controller and a mobile switching centre of FIG. 3.

In order for the mobile terminal 1 to establish a voice call with the terminating terminal 11, a Radio Resource Control (RRC) connection must first be established between the mobile terminal 1 and the RNC 4 using RRC messaging. This is shown in FIG. 6. An RRC connection procedure is the process by which the mobile terminal 1 is allocated a radio resource (i.e. a radio channel) on which to communicate data with the mobile radio network.

During the RRC connection procedure, usually additionally, a number of Direct Transfer (DT) messages are exchanged between the mobile terminal 1 and the Core network devices (MSC and/or SGSN) 4. The DT messages are a series of messages which are used to establish a signalling connection between the mobile terminal and the Core Network. The direct transfer messages are communicated across the Iub interface using the NBAP protocol described above. The data processor 12 is operable to intercept and inspect the RRC messages terminated at the RNC and the RRC-Transparent Direct Transfer messages destined for the CN. Correlating these RRC and RRC(DT) message sets which include IMSI, TMSI or RNTI allocated by the network to the mobile terminal 1 enables a set of bindings between Access and Core Networks to be determined. Therefore, upon interception by the data processor 12 of the RRC and RRC(DT) messages, the identity of the mobile terminal within the coverage area of the Node B, RNC and CN can be determined. This is shown in FIG. 6.

FIG. 6 illustrates an abbreviated flow diagram showing the exchange of messages between the mobile terminal 1 and the RNC 4 via a Node B. When the mobile is first switched on or moves into a coverage area provided by the Node B 2, a first series of messages 51 are exchanged in which the mobile terminal is allocated a TMSI/RNTI. Later, when the mobile terminal is attempting to originate a voice call, a second series of messages 52 are exchanged between the mobile terminal 1 when an RRC connection is being established. As described above, these messages include direct transfer messages. As the data processor 12 intercepts these messages on the Iub interface, the TMSI/RNTI of the mobile terminal 1 can be readily extracted and thus the identity of the mobile terminal determined.

Direct Transfer messages transmitted across the Iub interface from the Node B 1 to the RNC 4 are still in a form in which allows them to be identified per mobile—i.e. a direct mapping can be made between a TMSI/RNTI that can be extracted and an actual mobile terminal operating in the network. This means the Iub interface is a particularly convenient place to extract signalling plane data.

In some examples it may be useful to derive further information from the direct transfer messages about the state of the mobile terminal. As is known, mobile terminals which are switched on within a UMTS mobile radio networks can exist in a number of states or "modes" including CELL-DCH mode, CELL-PCH mode, CELL-FACH mode and IDLE mode. The type of communication session initiated by a mobile terminal will determine a state of the mobile terminal. In the present example, the aim is to identify mobile terminals engaged in voice calls and therefore mobile terminals of interest will be in CELL-DCH state.

Although the communication chain illustrated in FIG. 5 shows only one Node B 2 connected on the Iub interface to the RNC 4, it will be understood that as illustrated in FIG. 2, more typically a great many more Node Bs will actually be connected to the RNC 4 on the Iub interface. As is known, each Node B broadcasts a common pilot channel (CPICH) within the cell. Therefore, when intercepting the RRC direct transfer messages the data processor also extracts the common pilot channel (CPICH) ID to determine which coverage area (i.e.) cell, in which the identified mobile terminal is communicating.

Further useful information can also be extracted from information transmitted across the Iub interface by examining NBAP messages from the control plane to determine approximate ranging (i.e. distance of a mobile terminal from the Node B) so that a spread of ranges can be assessed for the coverage area by targeting active mobiles at various ranges in the cells. For example, the Node B controls the power with which signals are transmitted from the Node B 2 to the mobile terminals and the power with which signals are transmitted from the mobile terminals to the Node B. As explained above, this is generally in accordance with a relative distance of the mobile terminals from the Node B 2.

In summary, the information intercepted by the data processor 12 at the Iub/IuCS/IuPS interfaces includes:
1. TMSI/RNTI information identifying active mobile terminals within the network (it should be noted that it may also be able to determine the IMSI depending on a level of decode possible, in dependence on the messaging intercepted)
2. Information identifying which RRC mode/state the identified mobile terminals are in
3. Information identifying which Cell various mobile terminals are in.
4. Ranging information giving an estimate as to the distance from the Node B of the identified mobile nodes.
5. Samples of "in-call" and/or "in-session" data streams of particular selected mobiles for which at least one mobile address is known and for which the position/range may also have been determined and/or selected.

Therefore, for the example shown in FIG. 6, the data processor can determine the identity of the mobile terminal, what state it is in, which cell it is in and generate an estimation of its range from the Node B.

As will be understood, in a large network, many Node-Bs for example several thousand, may be attached to each RNC. Therefore it may not be necessary or even desirable to consider each active mobile terminal which is detected on the Iub interface. Therefore, in some embodiments the data processor is operable to choose a random or pre-determined selection of the TMSIs/RNTIs associated with the active mobile terminals. These selected TMSIs and RNTIs may then be used to target active user plane streams as they are transmitted across the IuCS (or in some embodiments the IuPS) interface.

In some embodiments the data processor 12 may apply further filtering and processing to the selected TMSIs/RNTIs. For example, to tailor the analysis performed for a particular network, a suitable population density of mobile terminals to be assessed can be set. As will be appreciated, the nature of mobile radio networks will vary. For example some networks may typically experience an even spread of active mobile terminals throughout the network. Other networks will be divided into regions which are densely populated with active mobile terminals and some regions which are sparsely populated with active mobile terminals. Accordingly, in order to derive a representative estimation of the quality of the radio interface, the data processor 12 allows the number of active mobile terminals selected to be set as a parameter. This could be arranged to occur automatically as a function of a total number of active mobile terminals in a given area.

As described above, for 3GPP, Release R1999, the voice data transmitted across the IuCS interface can be identified by the Connection IDs (CID) added to the voice data ATM frames by the ALCAP/RANAP protocols.

Accordingly, the data processor 12 is operable to correlate the selected TMSI/RNTIs with corresponding channel IDs and thereby identify AAL2 frames transmitted across the IuCS interface associated with voice calls originating from a particular mobile terminal. This can be achieved as each TMSI (or RNTI) is mapped in the RNC 4 to the mobile terminal's actual mobile subscriber identity number IMSI. As shown in FIG. 6, user data 53 is transmitted between the mobile terminal 1 and the MSC 8 and intercepted on the IuCS interface between the RNC 4 and MSC 8. A similar process can be undertaken to identify a particular mobile terminals GTP address over the IuPS interface and sample PS data streams for known mobile terminals.

Figure 7:
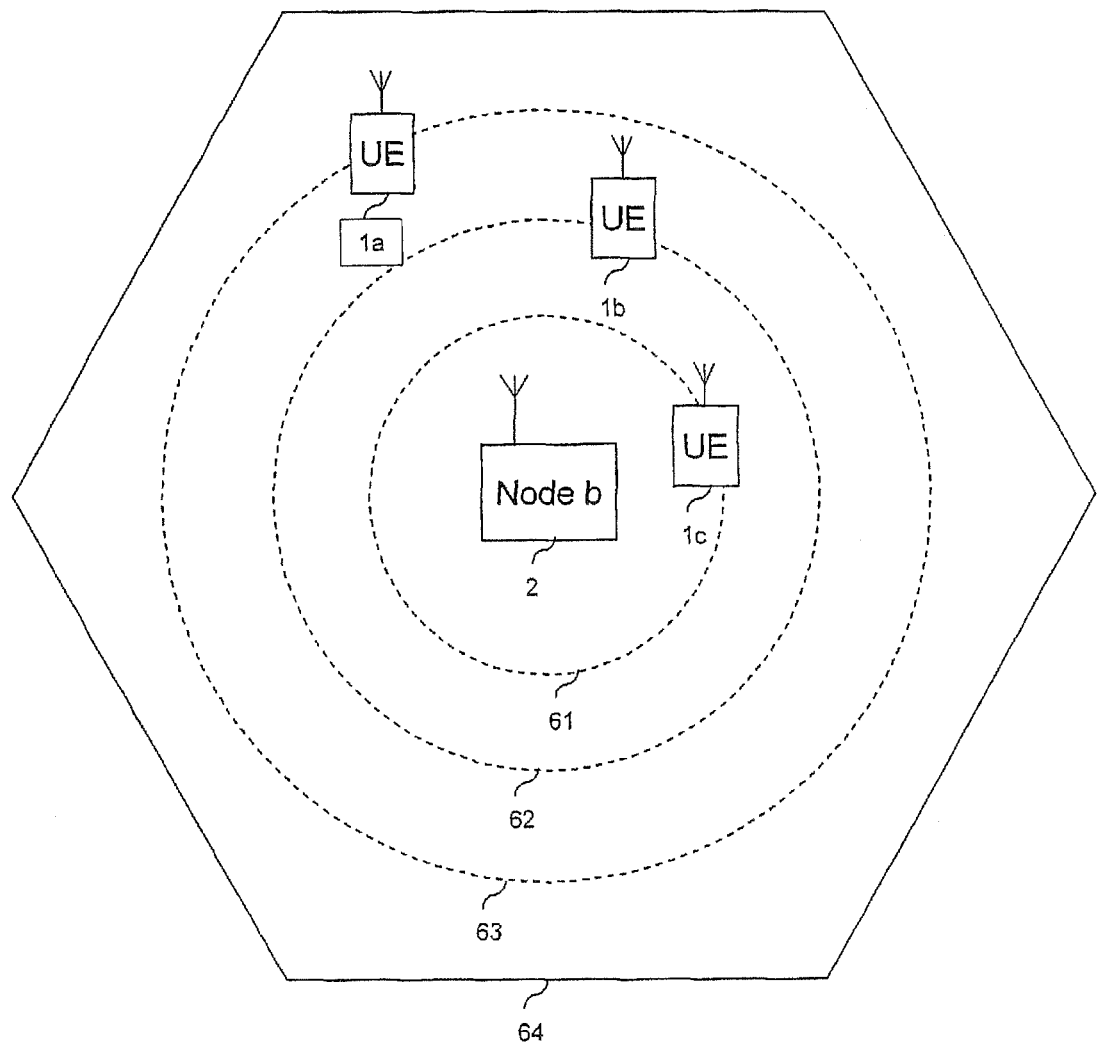
FIG. 7 provides a schematic diagram of a map that can be generated in accordance with the present technique.

Once a particular user plane AAL2 cell with data originating from a particular mobile terminal has been identified and intercepted by the data processor 12, a quality of the connection between the Node B and the mobile terminal can be determined by the data processor 12 by analysing the cell. This can be done in a number of ways. In one example, the quality of the connection can be derived by comparing a known value of the data transmitted from the mobile terminal with the actual received value. The greater the difference between the known value and the received value will provided an indication as to the quality of the link. Alternatively, the coding rate used by the codec can be analysed. In a circuit switched voice call in a UMTS network, the codec used is an adaptive multi-rate (AMR) codec, the coding for which will vary in dependence on the quality of the radio connection between the mobile terminal and the Node B. The coding rate currently being used by the AMR codec at the mobile terminal can be determined from the intercepted user plane AAL2 cell which can then be used to provide an indication FIG. 7 provides a schematic diagram of a map that can be generated in accordance with the present technique. A cell 64 provided by a Node B 4 includes three active mobile terminals 1*a*, 1*b*, 1*c*. A quality of the connection between a first mobile terminal 1*a* and the Node B 4 provides a contour 61 indicating a quality of connection available at a first distance from the Node B 4; a quality of the connection between a second mobile terminal 1*b* and the Node B 4 provides a contour 62 indicating a quality of connection available at a second distance from the Node B 4, and a quality of the connection between a third mobile terminal 1*c* and the Node B 4 provides a contour 63 indicating a quality of connection available at a third distance from the Node B 4.

Figure 8:
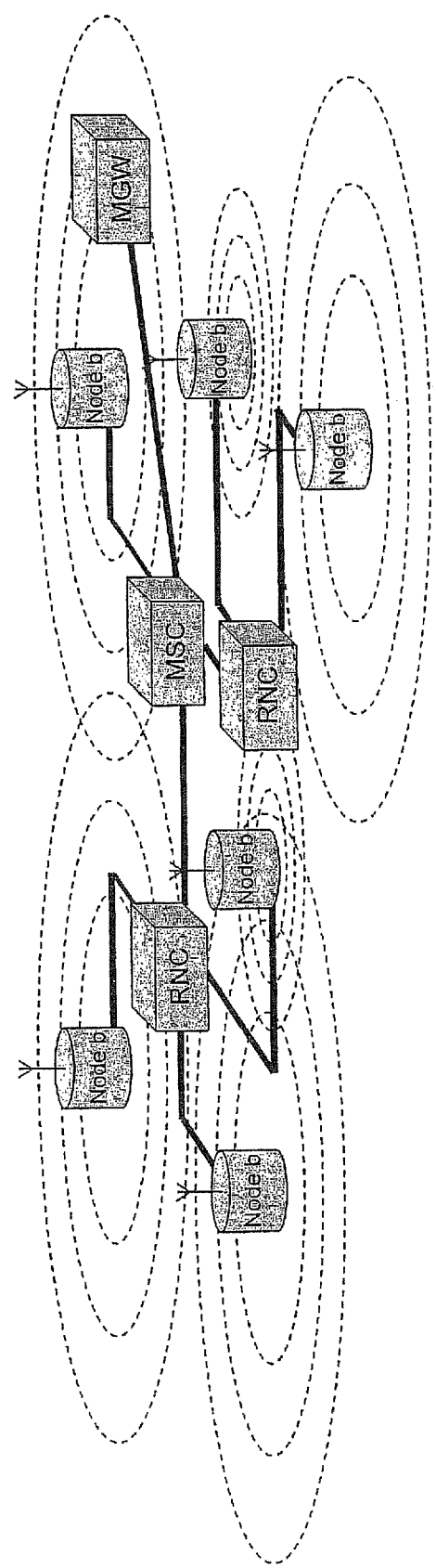
FIG. 8 shows a representation of the network illustrated in FIG. 3 and provides a schematic illustration indicating how a series of individual maps of the type illustrated in FIG. 7 can be aggregated to provide a map illustrating overall network performance provided by a plurality of base stations, and FIG. 9 provides a flow chart indicating steps of a method according to the present technique.
Figure 9:
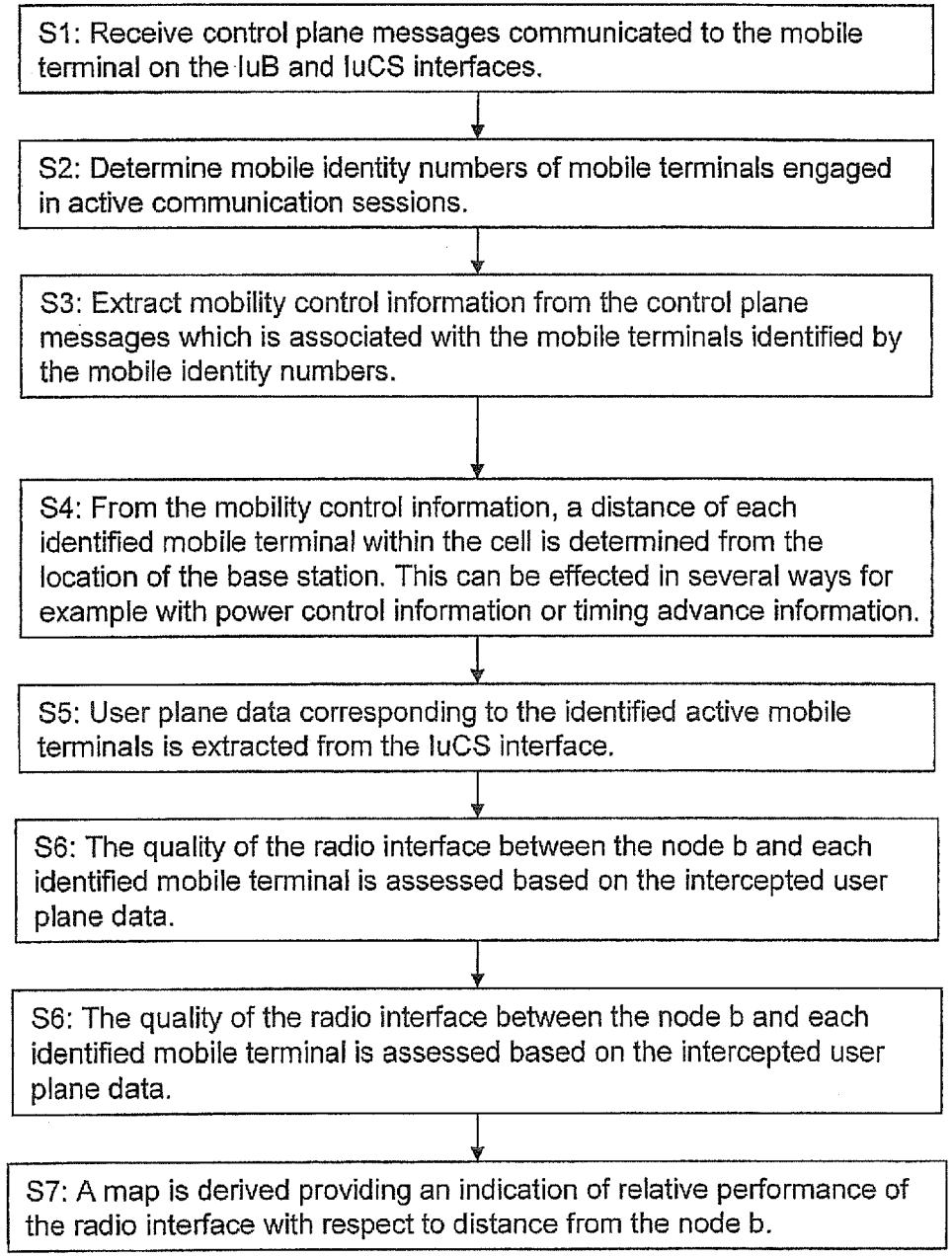

FIG. 8 shows a representation of the network illustrated in FIG. 3 and which provides a schematic illustration of how a series of individual maps of the type illustrated in FIG. 7 can be aggregated to provide a map illustrating overall network performance provided by a number of Node Bs. These maps can be used to represent the radio interface quality for any appropriate area (for example location area, routing area, service area, paging area, pooling area).

By targeting active mobile terminals and intercepting corresponding user plane data, the present invention provides significant efficiencies in capturing network performance data. However, even in view of these efficiencies, even for a medium sized coverage area the data processor 12 will have to capture and process a great deal of data. In order to reduce the amount of data that needs to captured and processed, without compromising the accuracy of the radio interface quality estimation, further efficiencies can be realised by taking into account statistics associated with particular communication sessions and user behaviour. For example in some networks a typical voice call lasts between thirty seconds and two minutes and data calls typically last from one second to thirty seconds and repeat every thirty seconds to two minutes for services like browsing.

Accordingly the period of time over which the data processor captures data can be divided into time segments or "epochs". Each epoch can be set to last a period of time which is long enough so that it is likely to capture enough data relating to enough communication sessions to generate an accurate estimation but not too long that a prohibitively large quantity of data is captured. For the statistics mentioned above, an appropriate period may be no longer than ten minutes and in some cases approximately five minutes.

The operation of the data processor 12 shown in FIG. 3 is summarised as follows and illustrated in FIG. 8.

S1: The data processor receives control plane messages communicated to the mobile terminal on the IuB and IuCS interfaces.

S2: The data processor determines mobile identity numbers of mobile terminals engaged in active communication sessions.

S3: Using the mobile identity numbers of the identified mobile terminals, mobility control information is extracted from the control plane messages which is associated with the mobile terminals identified by the mobile identity numbers.

S4: From the mobility control information, a distance of each identified mobile terminal within the cell is determined from the location of the base station. This can be effected in several ways for example with power control information or timing advance information.

S5: User plane data corresponding to the identified active mobile terminals is extracted from the IuCS interface.

S6: The quality of the radio interface between the Node B and each identified mobile terminal is assessed based on the intercepted user plane data.

S7: A map is devised providing an indication of relative performance of the radio interface with respect to distance from the Node B.

It will be appreciated that in embodiments of the present technique described above, elements of any of the above methods or processes may be implemented in the data processor 12 in any suitable manner. Thus the required adaptation to existing parts of a conventional equivalent device may be implemented in the form of a computer program product comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable or bespoke circuit suitable to use in adapting the conventional equivalent device.

It should be noted that coverage in this description includes any axis of performance that is able to be probed at any appropriate connected interface. Axis of performance will include, but are not limited to Radio Signal Quality, Circuit Call and Packet Session and Control messaging quantity and quality metrics.

Furthermore, Location Reporting and other positional related signalling can further determine positional accuracy if this signalling is present on one of the probed interfaces.

Various further aspects and features of the present invention are defined in the appended claims.

The invention claimed is:

1. A method of analyzing a radio network coverage area provided by a mobile radio network, the mobile radio network comprising at least one radio network part and a core network part, the radio network part comprising one or more base stations which are operable to provide a wireless communications interface for communicating data to and from mobile terminals within a radio coverage area provided by each of the base stations and one or more radio network controllers connected to the base stations via a first interface, the radio network controllers being operable to control the communication of data to and from the mobile terminals via the base stations, and the core network part is coupled to the radio network part via a second interface for communicating the data to and from the radio network part to support the communication of the data to and from the mobile terminals, the method comprising:

receiving, by at least one processor, control messages from a first interface, the control messages being provided for controlling the communication of the data to or from the mobile terminals via the base stations;

identifying, by the at least one processor, a mobile identity number associated with a selected mobile terminal from the control messages communicated via the first interface;

identifying, by the at least one processor, using the mobile identity number, mobility control messages communicated via the first interface, the mobility control messages providing an indication of a relative distance of the mobile terminal from the base station;

receiving, by the at least one processor, data communicated via a second interface between the radio network controller and a core network part of the mobile radio network;

identifying, by the at least one processor, the data communicated from the mobile terminal, using the mobile identity number identified from the first interface;

determining, by the at least one processor, a relative measure of quality of the data received from the mobile terminal, wherein said relative measure of said quality of the data is other than whether a call was dropped or retried;

generating, by the at least one processor, a performance map comprising:

providing a relative distance of the mobile terminal from the base station, and said quality of data communicated at the relative distance from the mobile terminal is other than whether a call was dropped or retried; and wherein the selecting one of the active mobile terminals comprises:

randomly selecting one or more of the active mobile terminals and for each, or for the active mobile terminal, identifying the mobile identity number, and selecting the active mobile terminals as a fraction of a total number of active mobile terminals in a predetermined area, and wherein the identifying, using the mobile identity number, the mobility control messages providing an indication of a relative distance of the mobile terminal from the base station, comprises:

identifying the control messages for the, or each mobile terminal, and wherein the identifying the data communicated from the mobile terminal, comprises:

identifying the data from the or each mobile terminal, and wherein the determining a relative measure of quality of the data received from the mobile terminal is performed for the, or each of the selected mobile terminals, so that the performance map is generated from the distance and quality measurements for the, or each mobile terminal.

2. The method as claimed in claim 1, wherein the identifying the mobile identity number associated with one of the mobile terminals from the control messages communicated via the first interface, comprises:

identifying from the control messages, one or more mobile terminals, which are actively communicating in accordance with an established communications session, and selecting one of the active mobile terminals, and identifying the mobile identity number associated with the selected active mobile terminal.

3. The method as claimed in claim 1, comprising generating one or more additional performance maps for one or more base station stations of the wireless network and combining the one or more additional performance maps with the performance map to provide a larger scale performance map.

4. The method as claimed in claim 1, wherein the mobility control messages providing the indication of the relative distance of the mobile terminal from the base transceiver station comprise power control mobility messages and propagation timing delay control messages.

5. A data processor for generating a performance map indicating a variation with distance from a base station of a quality of a radio interface provided to a mobile terminal, the radio interface being provided by the base and the performance map being generated in accordance with the method of claim 1.

6. A computer program product embodied on at least one non transitory computer accessible medium having computer executable instructions, which when executed by a computer processor causes the computer to perform the method according to claim 1.

7. The method according to claim 1, wherein said at least one processor comprises at least one processor of at least one probe, said probe coupled to said first interface and said second interface, wherein said at least one probe is used to capture data related to performance quality of service, and not for creating a call detail record.

8. The method according to claim 1, wherein said generating said performance map comprises:

extracting a statistical estimate of wireless communication performance.

9. The method according to claim 1, wherein said generating said performance map comprises:

extracting user plane data; and assessing quality based on the user plane data.

10. The method according to claim 1, wherein said generating comprises:

generating said performance map without a need for an operator to physically sample quality of data communications at a specific location within a coverage area of the base station.

11. The method according to claim 1, wherein said generating comprises:

estimating quality of data communications taking into account statistics associated with particular communication sessions and user behavior.

12. The method according to claim 11, wherein said estimating comprises:

dividing into a plurality of epoch time segments a period of time over which data is captured.

13. The method according to claim 12, wherein each said epoch time segment comprises:

less than or equal to substantially ten (10) minutes.

14. The method according to claim 13, wherein said each said epoch time segment comprises:

five (5) minutes.

15. The method according to claim 1, wherein said at least one processor comprises at least one processor of at least one probe, said probe coupled to said first interface and said second interface, and wherein said generating said performance map comprises:

extracting a statistical estimate of wireless communication performance, comprising:

extracting user plane data;

assessing quality based on the user plane data;

generating said performance map without a need for an operator to physically sample quality of data communications at a specific location within a coverage area of the base station; and estimating quality of data communications taking into account statistics associated with particular communication sessions and user behavior, and wherein said estimating comprises:

dividing into a plurality of epoch time segments a period of time over which data is captured; and wherein each said epoch time segment comprises at least one of:

less than or equal to substantially ten (10) minutes; or substantially five (5) minutes.

16. A telecommunications system for communicating data to and from mobile terminals via a mobile radio network, the mobile radio network comprising a radio network part and a core network part, the radio network part comprising one or more base stations which are operable to provide a wireless communications interface for communicating data to and from mobile terminals within a radio coverage area provided by each of the base stations, and at least one radio network controller coupled to the base stations via a first interface, the radio network controller being operable to control the communication of data to and from the mobile terminals via the base transceiver stations, and the core network part is coupled to the radio network part via a second interface for communicating the data to and from the radio network part to support the communications of the data to and from the mobile terminals, and the telecommunications system comprises
- a data processor operative to receive control messages from the first interface communicated between one of the base stations and the radio network controller operative to control the communication of the data to or from the mobile terminals via the base station,
- to identify a mobile identity number associated with one of the mobile terminals from the control messages communicated via the first interface,
- to identify, using the mobile identity number, mobility control messages communicated via the first interface, the mobility control messages providing an indication of a relative distance of the mobile terminal from the base station,
- to receive the data communicated via the second interface between the radio network controller and the core network,
- to identify the data communicated from the mobile terminal, using the mobile identity number identified from the first interface,
- to determine a relative measure of quality of the data received from the mobile terminal, wherein said relative measure of said quality of the data is other than whether a call was dropped or retried, and
- to generate a performance map providing a relative distance of the mobile terminal from the base station and a quality of data communicated at the relative distance from the mobile terminal is other than whether a call was dropped or retried,
- wherein said data processor operative to generate said performance map comprises:
- to extract a statistical estimate of wireless communication performance, comprising:
- to extract user plane data;
- to assess quality based on the user plane data; and
- to generate said performance map without a need for an operator to physically sample quality of data communications at a specific location within a coverage area of the base station; and
- wherein the determining a relative measure of quality of the data received from the mobile terminal is performed for the, or each of the selected mobile terminals, so that the performance map is generated from the distance and quality measurements for the, or each mobile terminal.

17. An apparatus for analyzing a radio network coverage area provided by a mobile radio network the mobile radio network comprising at least one radio network part and a core network part, the radio network part comprising one or more base stations which are operable to provide a wireless communications interface comprising means for communicating data to and from mobile terminals within a radio coverage area provided by each of the base stations and one or more radio network controllers coupled to the base stations via a first interface, the radio network controllers being operable to control the communication of data to and from the mobile terminals via the base stations, and the core network part is coupled to the radio network part via a second interface comprising means for communicating the data to and from the radio network part to support the communication of the data to and from the mobile terminals, the apparatus comprising:
- at least one memory; and
- at least one processor coupled to said at least one memory, wherein said at least one processor is configured to:
- receive control messages from a first interface, the control messages configured to control the communication of the data to or from the mobile terminals via the base station;
- identify a mobile identity number associated with a selected mobile terminal from the control messages communicated via the first interface;
- identify, using the mobile identity number, mobility control messages communicated via the first interface, the mobility control messages configured to provide an indication of a relative distance of the mobile terminal from the base station;
- receive data communicated via a second interface between the radio network controller and a core network part of the mobile radio network;
- identify the data communicated from the mobile terminal, configured to use the mobile identity number identified from the first interface;
- determine a relative measure of quality of the data received from the mobile terminal, wherein said relative measure of said quality of the data is other than whether a call was dropped or retried; and
- generate a performance map configured to provide a relative distance of the mobile terminal from the base station and a quality of data communicated at the relative distance from the mobile terminal is other than whether a call was dropped or retried,
- wherein said configuration to generate said performance map comprises:
- to extract a statistical estimate of wireless communication performance, comprising:
- to extract user plane data;
- to assess quality based on the user plane data; and
- to generate said performance map without a need for an operator to physically sample quality of data communications at a specific location within a coverage area of the base station; and
- wherein the configuration to determine a relative measure of quality of the data received from the mobile terminal is configured to be performed for the, or each of the selected mobile terminals, so that the performance map is generated from the distance and quality measurements for the, or each mobile terminal.

18. An apparatus for analyzing a radio network coverage area provided by a mobile radio network the mobile radio network comprising:
- at least one radio network part and a core network part, the radio network part comprising:
- one or more base stations comprising at least one processor, which are operable to provide a wireless communications interface configured to enable the at least one processor to communicate data to and from mobile terminals within a radio coverage area provided by each of the base stations and one or more radio network controllers coupled to the base stations via a first interface, the radio network controllers comprising at least one processor being configured to control the communication of data to and from the mobile terminals via the base stations, and the core network part is coupled to the radio network part via a second interface operative to enable the at least one processor to communicate the data to and from the radio network part to support the communication of the data to and from the mobile terminals, the apparatus comprising:

at least one memory; and at least one processor coupled to said at least one memory, comprising the at least one processor configured to:

receive control messages from a first interface, the control messages being provided operative to control the communication of the data to or from the mobile terminals via the base station;

identify a mobile identity number associated with a selected mobile terminal from the control messages communicated via the first interface;

identify, using the mobile identity number, mobility control messages communicated via the first interface, the mobility control messages operative to provide an indication of a relative distance of the mobile terminal from the base station;

receive data communicated via a second interface between the radio network controller and a core network part of the mobile radio network;

identify the data communicated from the mobile terminal, operative to use the mobile identity number identified from the first interface;

determine a relative measure of quality of the data received from the mobile terminal, wherein said relative measure of said quality of the data is other than whether a call was dropped or retried; and generate a performance map configured to provide a relative distance of the mobile terminal from the base station and a quality of data communicated at the relative distance from the mobile terminal is other than whether a call was dropped or retried, wherein said processor configured to generate said performance map comprises:

to extract a statistical estimate of wireless communication performance, comprising:

to extract user plane data;

to assess quality based on the user plane data; and to generate said performance map without a need for an operator to physically sample quality of data communications at a specific location within a coverage area of the base station; and wherein the processor configured to determine a relative measure of quality of the data received from the mobile terminal is performed for the, or each of the selected mobile terminals, so that the performance map is generated from the distance and quality measurements for the, or each mobile terminal.

* * * * *